E. C. BALLMAN.
ALTERNATING CURRENT RECTIFIER.
APPLICATION FILED JAN. 3, 1911.
1,131,896.
Patented Mar. 16, 1915.
2 SHEETS—SHEET 2.
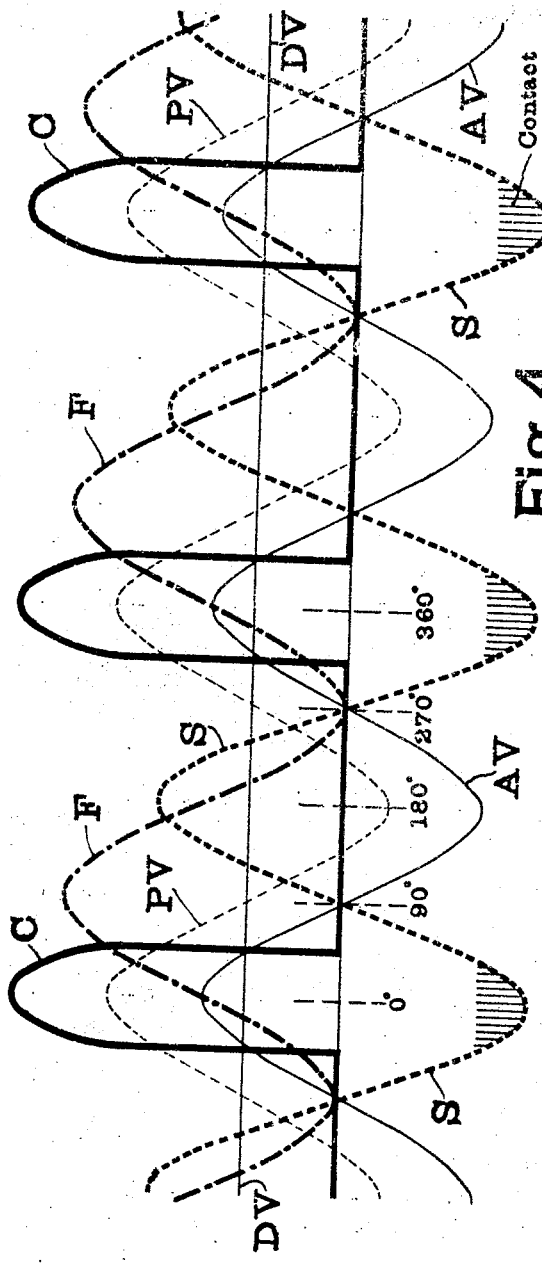
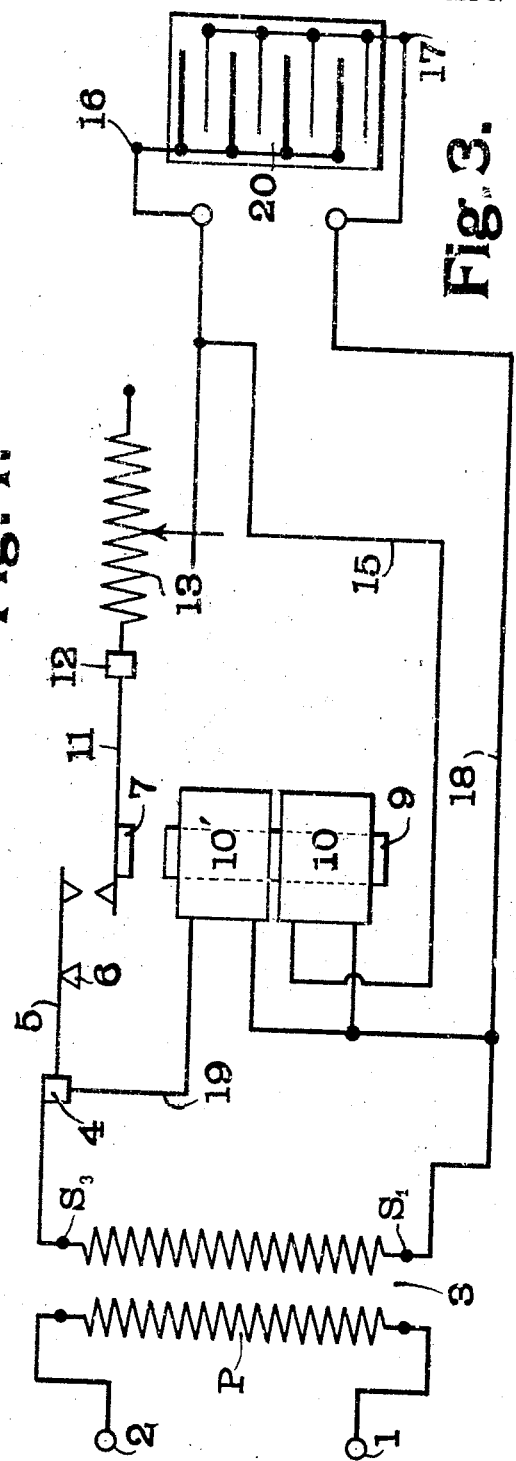
WITNESSES:
L. L. Mead
W. A. Alexander
INVENTOR
Edwin C. Ballman,
BY Fowler & Huffman
ATTORNEYS

UNITED STATES PATENT OFFICE.

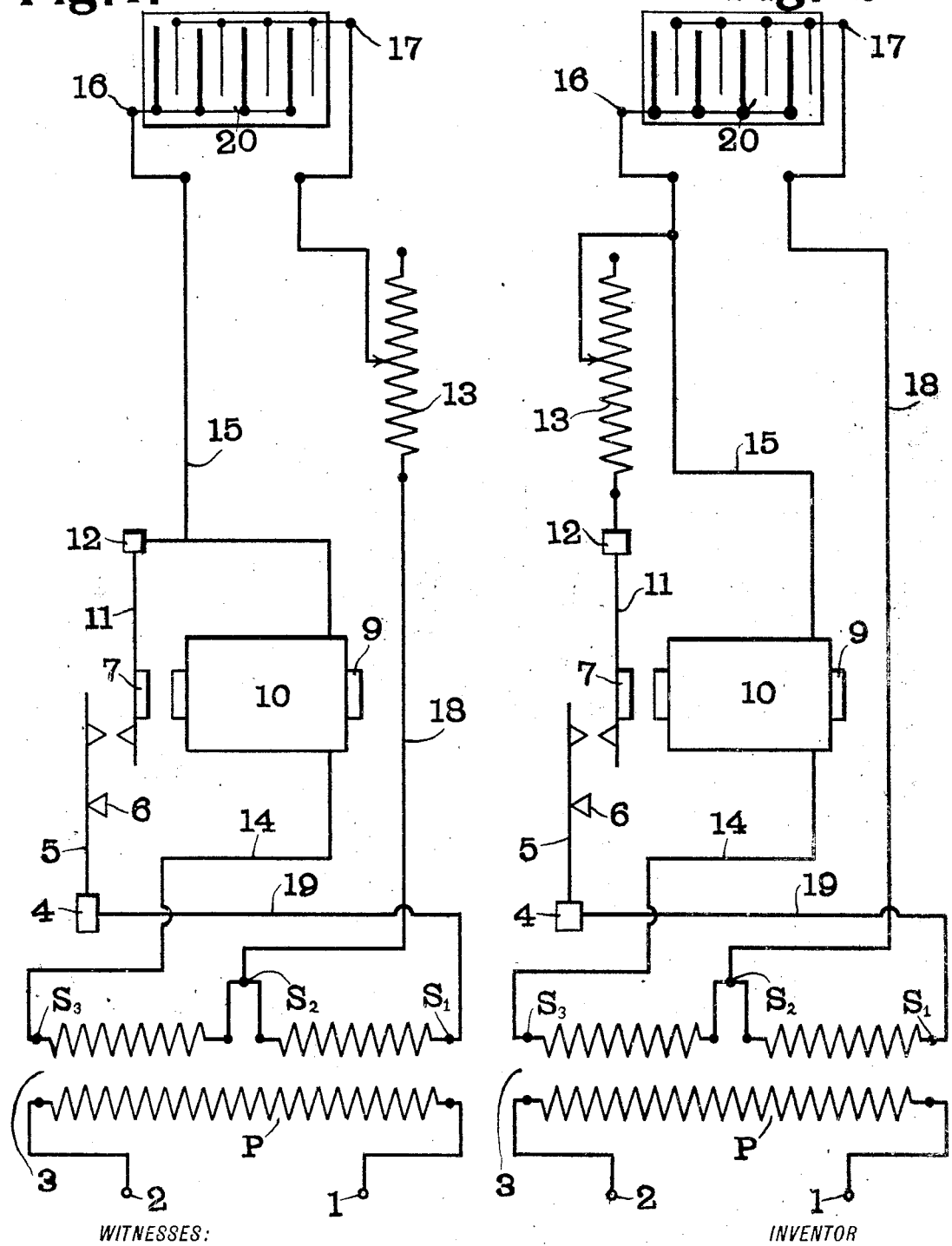

EDWIN C. BALLMAN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

ALTERNATING-CURRENT RECTIFIER.

1,131,896.  Specification of Letters Patent.  Patented Mar. 16, 1915.

Application filed January 3, 1911. Serial No. 600,429.

*To all whom it may concern:*

Be it known that I, EDWIN C. BALLMAN, a citizen of the United States, residing at the city of St. Louis, State of Missouri, have invented a certain new and useful Alternating-Current Rectifier, of which the following is such a full, clear, and exact description as will enable any one skilled in the art to which it appertains to make and use the same, reference being had to the accompanying drawings, forming part of this specification.

My invention relates to alternating current rectifiers of the type operated by electromagnetic devices and its object is to provide an apparatus which will transform a current drawn from an alternating supply into current which is unidirectional or in which the impulses in one direction are greater than those in the other. Such a current is particularly adapted to be used for charging storage batteries. In apparatus of the type mentioned it is necessary to use a transformer by means of which the desired voltage may be applied to the terminals of the storage battery and it is the particular object of my invention to so arrange the circuits and connections that when the current from the source is interrupted for any reason or the mains short-circuited, the battery cannot discharge through a short circuit and thus waste the energy previously stored. The apparatus is also so arranged that a current will be delivered to the storage battery in the proper direction to charge it regardless of which one of its terminals is connected to a given terminal of the charging circuit.

Other objects and advantages of my apparatus will appear from the description which follows.

In the accompanying drawings, Figure 1 is a diagrammatic representation of one form of my improved rectifier; Fig. 2 shows a slight modification in which the impedance is in the charging circuit only. In the apparatus shown in Fig. 3 the alternating and direct currents are supplied to separate coils of the electromagnet. Fig. 4 is a diagram showing the phase relation of the various voltages, of the flux, the charging current and the spring vibrations.

Referring first to Fig. 1, 3 is a transformer having its primary windings P supplied with an alternating current from the mains 1, 2. The secondary winding has a tap $S_2$ near its middle. This tap $S_2$ is connected to the terminal 17 of the storage battery 20 by way of the conductor 18 and the adjustable impedance 13. The terminal $S_3$ of the secondary winding is connected with the terminal 16 of the battery 20 through the conductor 14, the coil 10 around the core 9 of the electromagnet and through conductor 15. The terminal $S_1$ of the secondary winding is adapted to be connected to the terminal 16 of the storage battery 20 through conductor 19, binding-post 4, springs 5 and 11, binding-post 12 and conductor 15. The section of the secondary winding between $S_1$ and $S_2$ can discharge into the battery through the impedance 13 while current from the section between $S_2$ and $S_3$ can only reach the battery through the impedance 13 and the highly inductive winding of the electromagnet. The part $S_2$, $S_3$ does not carry as much current as the part $S_1$, $S_2$ and can therefore be wound with a smaller wire.

Spring 5 is held only at the binding-post 4 and is therefore free to vibrate. It is preferably so adjusted as to mass and length that its natural frequency of vibration is greater than the frequency of the alternating current. 6 is a stop which limits its vibration in one direction. Spring 11 carries an iron armature 7 and is supported by binding-post 12, secured to the base of the apparatus. This spring 11 and the mass of the armature 7 attached to it are preferably so adjusted that the vibration of the spring 11 is considerably less than the frequency of the alternating current. The resultant natural frequency of springs 5 and 11, when vibrating in unison, would be a mean of the individual natural frequencies if both vibrating elements had the same mass. In the present combination the mass of spring 11 is by far the greater and the resultant natural frequency of the combination will therefore more nearly approach the natural frequency of vibration of spring 11 than that of spring 5. Thus if the natural frequency of spring 5 is chosen 5% higher than the frequency of the alternating E. M. F. and that of spring 11 is chosen 10% lower, then since 11 has more mass than 5 the resultant natural frequency of the two springs vibrating in unison or of the combination, will not be 2½% but perhaps 5% lower than that of the alternating E. M. F. Spring 11 when at rest is out of contact with spring 5 but when vibrating comes into contact with it and thereby closes the charging circuit. It is necessary for the successful operation of this apparatus, *i. e.* in order to charge the battery and to do so without undue sparking, that the springs 5 and 11 shall make contact with each other only as long as the alternating E. M. F has a certain direction and exceeds a certain magnitude. These conditions are only fulfilled during a fraction of one cycle and it is therefore desirable that the period of an actual vibration of the springs be equal to that of the alternating E. M. F. and that the stop 6 be so adjusted as to suitably limit the time of contact. For the arrangements of circuits and contacts here described there should be a phase difference of about 180 degrees between the vibrations of the spring and the period of the alternating E. M. F. Now the actual period of vibration of the spring is controlled by the period of the flux in the core 9 of the electromagnet, whereas the phase relation of the period of vibration of the combined springs 5 and 11 to the period of the flux is determined by the frequency of the natural vibration of the combination of springs as compared to the frequency of the flux. If the frequency of the natural vibration of the combined springs is a little smaller than the frequency of the flux then the vibrations of the springs when the latter are brought within the influence of the flux, will be increased so as to become equal in frequency to that of the flux, but the phase of said vibrations will lag behind the phase of the flux by an amount dependent on the initial difference of the respective frequencies. If the natural frequency of vibration of the springs is greater than that of the flux, then the frequency of vibration will be diminished by the influence of the flux until it corresponds to that of the flux, but the phase of the said vibrations will lead the phase of the flux vibrations. If the difference between the natural frequency of the spring combination and the frequency of the flux is too great in either direction, then the springs will not respond to the flux sufficiently to make contact in the manner described. The phase relation of the flux in the core of the electromagnet to the phase of the alternating E. M. F. is determined by the reactance and resistance of the exciting circuit of said core and can therefore be adjusted by adjusting said reactance or said resistance or both. Since the phase relation between the core flux and the alternating E. M. F. is under control as well as the phase relation between the vibration of the springs and the period of the flux, then it is clear that the desired phase relation between said vibration and said alternating E. M. F. can be secured with the help of any or all of the adjustments which have just been described. When the desired phase relation has been secured the stop 6 can be adjusted so that the springs 11 and 5 remain in contact during a suitable time interval.

The exciting circuit is fed from that part of the transformer winding which is located between the terminals $S_2$ and $S_3$ and comprises the coil 10 of the electromagnet, the battery 20 and the impedance 13. The charging circuit is fed from the coil of the transformer located between $S_1$ and $S_2$ and comprises the springs 5 and 11 with their contacts, the battery 20 and the impedance 13. The maximum instantaneous value of the voltage derived from the line should be chosen a little greater than the maximum voltage of the battery to be charged. When the alternating voltage is in one direction it coöperates with the battery voltage in sending an exciting current through the coil 10 which sets up a comparatively large flux in the core 9 and attracts the armature 7. When the voltage from the line opposes the voltage of the battery through coil 10 the flux set up in the core is necessarily much smaller and the stiffness of the spring 11 carrying the armature is such that this smaller flux is insufficient to initiate the armature vibrations. The resultant pulsating voltage through coil 10 is represented by the curve PV in Fig. 4, and it will be seen that the spring vibrations will be initiated at the correct instant whether the positive battery pole is connected to the terminal 16 or the terminal 17.

The coil 10 takes a discharging current from the battery 20. But since this coil is made up of a number of turns of fine wire of high resistance the discharging current is small in comparison with the charging current and the net result of the operation of the device is an increase of the energy stored in the battery. It will be seen that should the alternating current from the source be interrupted for any reason, a small battery current will continue to flow through the coil 10 but the vibration of the spring 11 will be stopped thus preventing any possibility of contact with spring 5 and any discharge of the battery through the low resistance charging circuit. The possibility of a rapid discharge of the battery is thus obviated and it becomes unnecessary to keep a close watch on the operation of the apparatus.

Fig. 2 shows a device similar to Fig. 1, the only difference being that the impedance 13 is so placed as to be included in the charging circuit only, thus making the magnitude and the phase of the voltage at the terminals of the magnet coils independent of the charging current.

In Fig. 3 the battery voltage and the voltage derived from the line are applied to separate coils 10 and 10' respectively but the effect upon the flux in the core 9 is the same as in Fig. 1.

In Fig. 4 the curve AV represents the alternating current voltage derived from the line by means of the transformer; the line DV shows the battery voltage and the curve PV the pulsating voltage which is the resultant of the alternating current voltage and the voltage of the battery. The flux in the core 9 is represented by the curve F and is here shown as varying from zero to a certain value in a positive direction. As a matter of fact, it may be slightly in a negative direction at certain intervals but this can be disregarded. The vibration of the springs is represented by the curve S and the shaded portions show the time of contact between the springs during which time the charging current C flows.

I will now give a detailed explanation of the operation of my improved rectifier referring particularly to Figs. 1 and 4. Assuming (1) that the armature is in the position shown in Fig. 1, consider the instant when the positive alternating voltage in the secondary of the transformer is at its maximum and is directed from $S_3$ to $S_1$. Assume (2) that the battery voltage is directed from the terminal 17 through the battery 20 to terminal 16. Then the alternating current voltage, plus the direct current voltage, i. e., the pulsating voltage, will have reached its positive maximum at the instant under consideration. Assume (3) that the impedance of the exciting circuit is such that the flux lags 90 degrees behind the pulsating E. M. F., then the maximum value of the pulsating flux will be reached one quarter of a period later than the positive maximum of the alternating voltage. Assume (4) that the resultant natural frequency of vibration of the two springs is such as to cause the spring vibration to lag 90 degrees behind the flux then the armature 7 will be in its nearest position to the core 9 one quarter of a period after the flux has reached its maximum and half a period after the positive maximum of the alternating E. M. F. and after the instant first considered. When the armature is nearest to the core 9 the alternating current voltage has reversed and has reached its negative maximum. The pulsating voltage is now due to the difference between the alternating and direct current E. M. F.'s and the pulsating flux is about half of its maximum intensity. When, 90 degrees later the armature has reached the initial position on its return vibration the alternating current voltage is zero. The pulsating voltage is consequently equal to the direct current voltage and the flux is zero or negative.

When the armature has progressed somewhat less than 90 degrees beyond the position last mentioned it makes contact with the spring 5 and closes the charging circuit. At this instant the alternating current voltage is positive, it opposes the direct current voltage and is beginning to exceed the same. At the same time the pulsating voltage approaches its maximum but is due solely to the sum of the alternating E. M. F.'s in the two parts of the transformer secondary. The pulsating flux is increasing and has reached about half of its maximum intensity. If the stop 6 has been properly adjusted then the contact between the armature and the spring 5 will be broken at the instant when the alternating current voltage has so far diminished as to very nearly or exactly equal but is still opposed to the battery voltage. Somewhat less than one quarter of a period later the armature reaches its initial position, and the cycle of operations as just described is repeated.

Should the battery connections to the terminals 16 and 17 be reversed then the maximum of the pulsating flux coincides with the negative maximum of the alternating E. M. F. and the armature will start to vibrate one half of a period later and the charging circuit will be closed one half of a period later, thus reversing the polarity of the charging E. M. F. It is apparent therefore, that it is immaterial whether the positive battery terminal is connected to the terminal 16 or to the terminal 17 of the apparatus, since the latter will always so operate as to supply a charging current of greater value than the discharging current which is permitted to flow.

Having fully described my invention what I claim as new and desire to secure by Letters Patent of the United States is:

1. In an alternating current rectifier, the combination with a source of alternating current, of a transformer, an electro-magnet connected to said source through said transformer, a circuit closer operated by said magnet and having a natural frequency of vibration approximating the frequency of the alternating current but sufficiently different therefrom that the phase of the actual vibration of the armature resulting from the influence of the exciting flux of the magnet and the armature's natural frequency shall be substantially in opposition to the phase of the alternating E. M. F., said circuit closer, when at rest, being in its open position, and a source of direct current connected to supply an uninterrupted current to the electro-magnet when no alternating current is flowing.

2. In an alternating current rectifier, the combination with a source of alternating current, of a transformer connected thereto, an electro-magnet connected to said transformer, a circuit closer operated by said magnet and having a natural frequency of vibration approximating the frequency of the alternating current but sufficiently different therefrom that the phase of the actual vibration of the armature resulting from the influence of the exciting flux of the magnet and the armature's natural frequency shall be substantially in opposition to the phase of the alternating E. M. F., said circuit closer, when at rest, being in its open position, an accumulator to be charged, said accumulator being in circuit with a coil of the electro-magnet and supplying an uninterrupted direct current to said coil when no alternating current is flowing.

3. In a current rectifying apparatus, the combination with an alternating current source, of a transformer, an electro-magnet, an accumulator to be charged, a charging circuit including said transformer and said accumulator, an armature operated by said electro-magnet for closing said charging circuit and having a natural frequency of vibration approximating the frequency of the alternating current but sufficiently different therefrom that the phase of the actual vibration of the armature resulting from the influence of the exciting flux of the magnet and the armature's natural frequency shall be substantially in opposition to the phase of the alternating E. M. F., and a permanently closed exciting circuit including the accumulator and a winding of the electro-magnet.

4. A current rectifying apparatus comprising the combination with a source of alternating current of a transformer, an electro-magnet connected thereto, a spring-mounted armature operated by said magnet, a second spring in electrical connection with the transformer and out of contact with said armature when the armature is at rest but positioned to make electrical contact therewith at intervals when the armature is vibrating.

5. A current rectifying apparatus comprising the combination with a source of alternating current, of a transformer, an electro-magnet connected thereto, a spring-mounted armature for said magnet having a natural frequency of vibration less than the frequency of the alternating current, a second spring connected to the source of alternating current and out of contact with said armature when the armature is at rest but positioned to make electrical contact therewith at intervals when the armature is vibrating.

6. A current rectifying apparatus comprising the combination with a source of alternating current, of a transformer, an electro-magnet connected thereto, a spring-mounted armature for said magnet, a second spring out of contact with said armature when the armature is at rest but positioned to contact therewith at intervals when the armature is vibrating, said second spring having a natural frequency of vibration greater than the frequency of the alternating current, and an accumulator in circuit with the armature.

7. A current rectifying apparatus comprising the combination with a source of alternating current, of a transformer, an electro-magnet connected thereto, a spring-mounted armature for said magnet having a natural frequency of vibration less than the frequency of the alternating current, a second spring out of contact with said armature when the armature is at rest, but positioned to contact therewith at intervals when the armature is vibrating, said second spring having a natural frequency of vibration greater than the frequency of the alternating current, and an accumulator to be charged, said armature and said electromagnet being connected to the accumulator in parallel circuits.

8. In a current rectifying apparatus, the combination with an alternating current source, of a transformer, an electro-magnet, an impedance, an accumulator to be charged, a charging circuit including said transformer, said impedance and said accumulator, an armature operated by the electrolator, an armature operated by the electro-magnet for closing the charging circuit, said armature having a natural frequency of vibration approximating to but being appreciably different from the frequency of the alternating current, and a permanently closed exciting circuit including the accumulator and a winding of the electro-magnet.

9. A current rectifying apparatus comprising the combination with a source of alternating current, of a transformer, an electro-magnet connected thereto, a spring-mounted armature for said magnet having a natural frequency of vibration less than the frequency of the alternating current, a second spring normally out of contact with said armature but positioned to contact with it during part of its vibration, said second spring making contact with said armature only when the armature has rebounded away from the electro-magnet, and an accumulator to be charged, said armature and said electro-magnet being connected to the accumulator in parallel circuits.

10. In a current rectifying apparatus, the combination with an alternating current source, of a transformer, an electro-magnet, one of which is provided with two coils one of which is connected with the transformer, an accumulator to be charged, a charging circuit including said transformer and said accumulator, an armature operated by said electro-magnet for closing said charging circuit, said armature having a natural frequency of vibration approximating to but being appreciably different from the frequency of the alternating current, and a permanently closed exciting circuit including the accumulator and the second winding of the electromagnet.

11. A current rectifying apparatus comprising a transformer, an electro-magnet provided with two coils one of which is connected to the transformer, a spring mounted armature for said magnet, a second spring connected to the transformer and out of contact with the armature when said armature is at rest but positioned to contact therewith at intervals when the armature is vibrating, an accumulator to be charged, said accumulator being connected to the second coil of the electro-magnet.

12. A current rectifying apparatus comprising the combination with a source of alternating current, of a transformer, an electromagnet connected thereto, an armature operated by said magnet and having one end free to vibrate, a spring in electrical connection with said transformer and out of contact with said armature when the armature is at rest but positioned to make electrical contact therewith at intervals when the armature is vibrating.

13. A current rectifying apparatus comprising the combination with a source of alternating current, of a transformer, an electromagnet connected thereto, a spring mounted armature for said magnet having one end free to vibrate and having a natural frequency of vibration less than the frequency of the alternating current, a second spring out of contact with said armature when the armature is at rest, but positioned to contact therewith at intervals when the armature is vibrating, said second spring having a natural frequency of vibration greater than the frequency of the alternating current, and an accumulator to be charged, said armature and said electromagnet being connected to the accumulator in parallel circuits.

In testimony whereof, I have hereunto set my hand and affixed my seal in the presence of the two subscribing witnesses.

EDWIN C. BALLMAN. [L. S.]

Witnesses:
   M. L. FRANKLIN,
   W. O. LAYMAN.